(No Model.) 2 Sheets—Sheet 1.
C. T. BOYER.
BUNCHING ATTACHMENT FOR MOWING MACHINES.
No. 558,150. Patented Apr. 14, 1896.
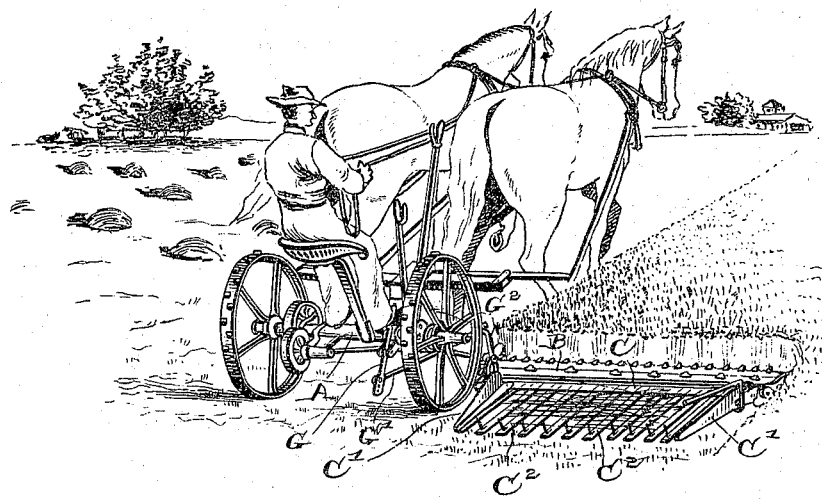
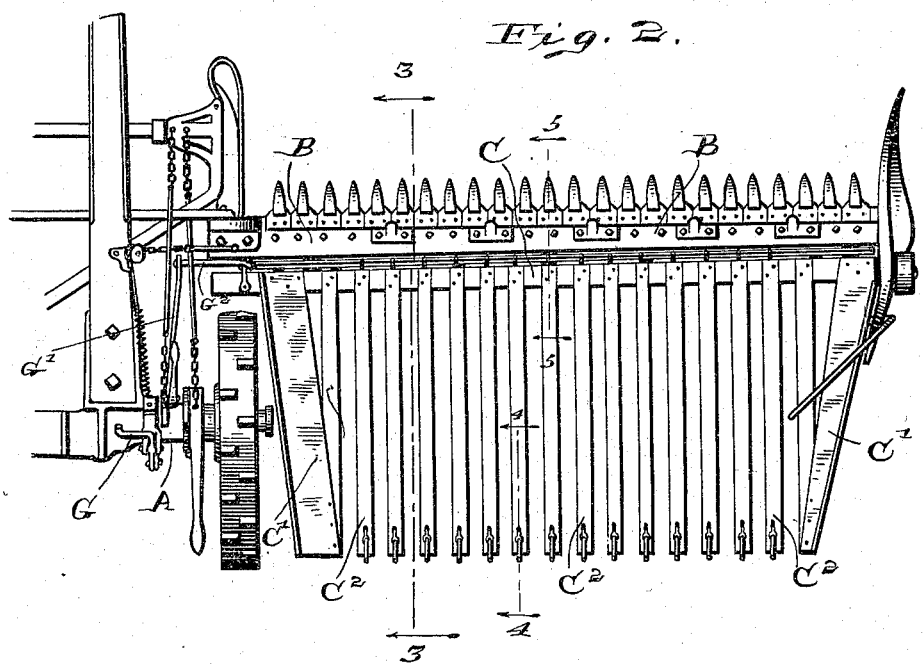
WITNESSES:
INVENTOR
Charles T. Boyer,
BY
Chester ... Bradford,
ATTORNEY.

(No Model.) 2 Sheets—Sheet 2.
C. T. BOYER.
BUNCHING ATTACHMENT FOR MOWING MACHINES.
No. 558,150. Patented Apr. 14, 1896.
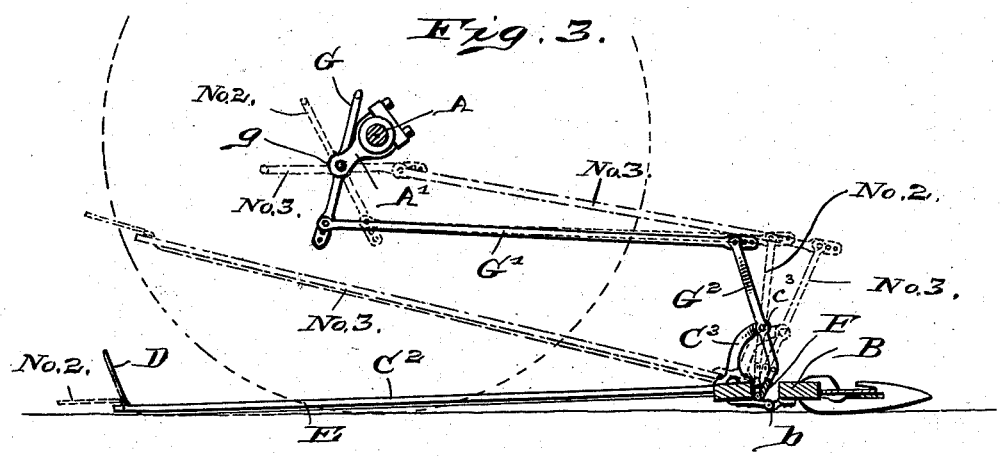
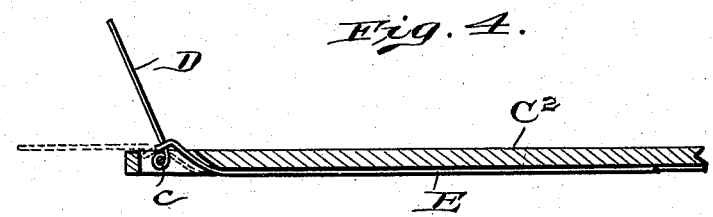
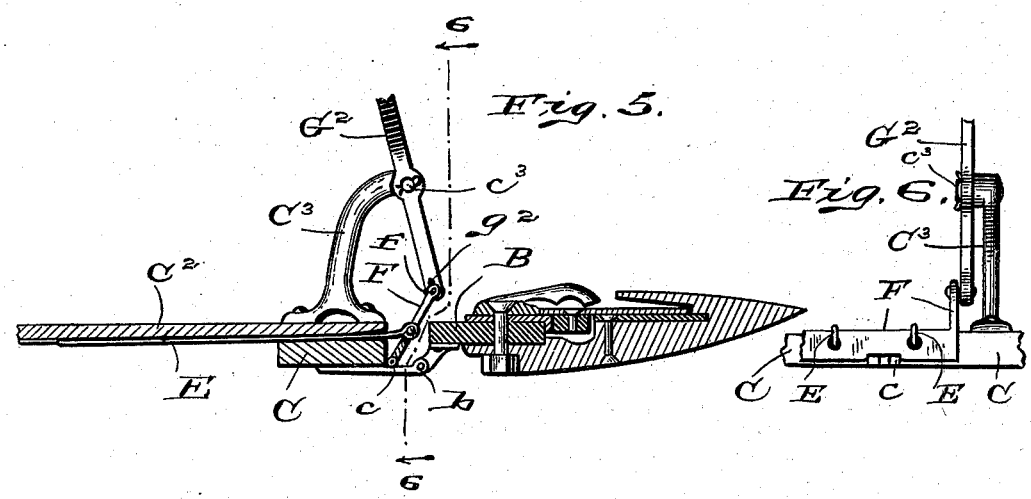
WITNESSES:
H. D. Nealy
J. A. Walsh
INVENTOR
Charles T. Boyer,
BY Chester Bradford,
ATTORNEY.
ANDREW B.GRAHAM. PHOTO-LITHO. WASHINGTON, D.C.

UNITED STATES PATENT OFFICE.

CHARLES T. BOYER, OF INDIANAPOLIS, INDIANA, ASSIGNOR TO THE AMERICAN BUNCHER MANUFACTURING COMPANY, OF SAME PLACE.

BUNCHING ATTACHMENT FOR MOWING-MACHINES.

SPECIFICATION forming part of Letters Patent No. 558,150, dated April 14, 1896.

Application filed July 31, 1895. Serial No. 557,731. (No model.)

*To all whom it may concern:*

Be it known that I, CHARLES T. BOYER, a citizen of the United States, residing at Indianapolis, in the county of Marion and State of Indiana, have invented certain new and useful Improvements in Bunching Attachments for Mowing-Machines, of which the following is a specification.

The object of my said invention is to provide a convenient and efficient means whereby hay or grass in being cut can be deposited in bunches over the field as it comes from the mowing-machine, instead of being distributed thinly over said surface, as is commonly done by the use of ordinary mowers not having a special attachment. To so bunch the grass is especially desirable in cutting clover, where it is an object to save the seed, in which case, as is well known, the clover should be left in bunches and subject to the action of the weather for a time, during which period it should be disturbed as little as possible.

My present invention consists in an improved attachment whereby the above-stated object is accomplished, as will be hereinafter more particularly described and claimed.

Referring to the accompanying drawings, which are made a part hereof and on which similar letters of reference indicate similar parts, Figure 1 is a perspective view illustrating a mowing-machine in use, which is provided with an attachment embodying the present form of my said invention; Fig. 2, a top or plan view of said attachment and the immediately adjacent parts of the machine; Fig. 3, a diagrammatic longitudinal vertical sectional view as seen from the dotted line 3 3 in Fig. 2, the position of the main wheel of the mowing-machine being indicated by dotted lines, as also are the several positions of my attachment; Fig. 4, a detail sectional view on the dotted line 4 4 in Fig. 2, on an enlarged scale; Fig. 5, a detail sectional view, also on an enlarged scale, on the dotted line 5 5 in Fig. 2; and Fig. 6, a detail sectional view as seen from the dotted line 6 6 in Fig. 5.

In said drawings the portions marked A represent the axle of the mowing-machine; B, the cutter-bar thereto; C, the main or transverse bar of the frame of my attachment; D, the stop-fingers of said attachment; E, rods which operate said stop-fingers; F, a multiplex lever connected to said operating-rods, and G a foot-lever carried by the mowing-machine axle or frame, which, through an intermediate connecting-rod and lever, operates said lever F.

The mowing-machine as a whole, including the axle A and finger-bar B, is or may be of any ordinary or desired construction and needs no special description.

It may be here stated that my attachment is intended for use with and is adapted to be applied to any ordinary form of mowing-machine. The operating-lever G is shown as attached to a shackle or clip A', bolted onto the axle A. It is, of course, unimportant as to what particular part of the axle or of the mowing-machine frame this operating-lever is pivoted, and it may be mounted upon other parts of the frame without departing from my invention.

As in my other inventions relating to this general subject-matter, the main portion of the bunching attachment is hinged to the finger-bar of the mowing-machine, the connection in this case being made by hinge-pivots $b$, as shown most plainly in Fig. 5. It consists of a main transverse bar C, with the two (preferably converging) combined side bars and plates C', and between these a series of rods or bars $C^2$, which are firmly attached to the bar C at one end and extend rearwardly and are free at the rear ends. This structure as a whole is substantially a slatted platform and is free to move on the hinge-pivots $b$, by which it is connected to the finger-bar B. As shown most plainly in Fig. 2, the sides C' converge as they approach the rear, so that the hay or grass in being cut is drawn somewhat together and particularly is drawn away from the field of standing grass, so as to leave a clear space between the bunches and said standing grass in which the wheel of the machine on the next passage may travel. The outer side bar should converge somewhat more sharply than the inner side bar, as is clearly shown in the drawings, particularly Fig. 2.

The stop-fingers D are mounted, preferably, in slots in the rear ends of the bars or rods $C^2$ on pivots $c^2$ and are adapted to be shifted from the position shown by full lines to the position shown by dotted lines, all as most clearly illustrated in Fig. 4. They serve, when in their raised position, as stops for the grass or hay being cut, which slides back from the cutter mechanism of the mowing-machine, over the bars $C^2$, against these stop bars or fingers, being impelled thereto by the stubble which extends up between the bars $C^2$, and said fingers hold said hay or grass from being discharged until a bunch of the required size has been accumulated, when said fingers are dropped to the position shown by dotted lines, and the bunch, still impelled by the stubble extending up between the bars $C^2$, will be pulled off.

The rods E extend beneath the bars $C^2$, or in grooves or perforations therein, from the front end of the attachment back to the stop-fingers D, to which they are connected, and are the means whereby said stop-fingers are raised and lowered from the levers, as will presently be described.

The multiplex lever F is connected to or in front of the bar C by the fulcrum-pivot $c$, and all the rods E are connected thereto in the manner plainly shown in Figs. 5 and 6. Said lever is capable of moving from the position shown in full lines in Fig. 5 to an upright position, (shown by dotted lines in Fig. 3,) by which movement the rods E are moved sufficiently so that the stop-fingers D are moved from their raised to their lowered position, and the reverse movement of course raises them from their lowered to their raised position. When said multiplex lever F has reached the upright position, its further movement is arrested by contact with the front of the structure of my attachment, and it then becomes practically an extension of its operating-lever $G^2$.

The foot-lever G is mounted on a pivot $g$ in the shackle or bearing arm A', mounted on the lower shaft A. It operates, through the connecting-rod G' and intermediate lever $G^2$, to actuate the multiplex lever F, and, after said multiplex lever has reached the limit of its movement, to actuate the entire bunching attachment on its pivot $b$ and raise it to the position shown by the dotted lines in Fig. 3, this latter movement being for the purpose of raising it out of contact with the ground, so that it will not interfere with turning the machine or become worn in transporting the machine from place to place—that is, the ordinary movement in depositing the bunches is to force the foot-lever, connecting-rod, and intermediate lever to the dotted-line positions marked "No. 2," and the movement in raising the bunching attachment is to force said parts to the dotted-line positions marked "No. 3," all as illustrated in Fig. 3. The intermediate lever $G^2$ and the multiplex lever F are connected by means of a slot $g^2$ and pin $f$, which is capable of sliding in said slot. Said lever $G^2$ is mounted on the arm $C^3$ by means of a pivot $c^3$.

Having thus fully described my said invention, what I claim as new, and desire to secure by Letters Patent, is—

1. The combination, with a mowing-machine, of a bunching attachment secured thereto consisting of a pivoted slatted platform, stop-fingers secured to the slats of the platform, operating-rods connected to said fingers, a multiplex lever connected to said rods, a foot-lever mounted on a mowing-machine, and connections between said foot-lever and said multiplex lever, whereby by operating said foot-lever said stop-fingers may be raised or lowered, substantially as set forth.

2. The combination, with a mowing-machine, of a bunching attachment hinged or pivoted in the rear of the cutter-bar, stop-fingers at the rear of said bunching attachment, connections running from said stop-fingers to the front end of said bunching attachment, a lever mounted on the mowing-machine structure, connections between said lever and said bunching attachment including a duplex lever F and an intermediate lever $G^2$, said last-named lever being capable of movement for a certain distance, and thus operating the stop-fingers, and then, upon a further movement, operating to raise the bunching attachment as a whole, substantially as shown and described.

In witness whereof I have hereunto set my hand and seal, at Indianapolis, Indiana, this 26th day of July, A. D. 1895.

CHARLES T. BOYER. [L. S.]

Witnesses:
CHESTER BRADFORD,
JAMES A. WALSH.